United States Patent
Marshall et al.

(10) Patent No.: US 10,296,413 B2
(45) Date of Patent: May 21, 2019

(54) RECOVERY ENVIRONMENT FOR A VIRTUAL MACHINE

(71) Applicant: Microsoft Technology Licensing, LLC, Redmond, WA (US)

(72) Inventors: Allen Marshall, Snohomish, WA (US); Kevin M. Broas, Kirkland, WA (US); Christopher Warner McCarron, Hartford, CT (US); David A. Hepkin, Redmond, WA (US); Mathew John, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 141 days.

(21) Appl. No.: 15/447,928

(22) Filed: Mar. 2, 2017

(65) Prior Publication Data

US 2017/0315859 A1    Nov. 2, 2017

Related U.S. Application Data

(60) Provisional application No. 62/330,745, filed on May 2, 2016.

(51) Int. Cl.

| | |
|---|---|
| *G06F 11/00* | (2006.01) |
| *G06F 11/07* | (2006.01) |
| *G06F 9/455* | (2018.01) |
| *G06F 21/62* | (2013.01) |
| *G06F 11/14* | (2006.01) |

(52) U.S. Cl.
CPC ...... *G06F 11/0793* (2013.01); *G06F 9/45558* (2013.01); *G06F 11/0709* (2013.01); *G06F 11/079* (2013.01); *G06F 11/0712* (2013.01); *G06F 11/0751* (2013.01); *G06F 11/0772* (2013.01); *G06F 11/1469* (2013.01); *G06F 11/1484* (2013.01); *G06F 21/6218* (2013.01); *G06F 2009/45583* (2013.01); *G06F 2009/45587* (2013.01)

(58) Field of Classification Search
CPC ............ G06F 11/1469; G06F 11/0709; G06F 11/0712
See application file for complete search history.

(56) References Cited

U.S. PATENT DOCUMENTS

| | | | |
|---|---|---|---|
| 8,538,919 B1 * | 9/2013 | Nielsen | G06F 9/5077 380/277 |
| 8,935,375 B2 | 1/2015 | Dournov et al. | |

(Continued)

OTHER PUBLICATIONS

Tan, et al., "TinyChecker: Transparent protection of VMs against hypervisor failures with nested virtualization", In Proceedings of IEEE/IFIP 42nd International Conference on Dependable Systems and Networks Workshops, Jun. 25, 2012, 7 pages.

(Continued)

*Primary Examiner* — Charles Ehne

(57) ABSTRACT

Techniques for a recovery environment for a virtual machine are described herein. Generally, a recovery environment provides a secure environment in which a damaged virtual machine can undergo repair procedures without compromising the security of the damaged virtual machine. In at least some implementations, a recovery environment represents an instance of a virtual machine that is executed to wrap a damaged virtual machine to enable the damaged virtual machine to be repaired.

19 Claims, 12 Drawing Sheets

(56) References Cited

U.S. PATENT DOCUMENTS

| | | |
|---|---|---|
| 9,003,502 B2 | 4/2015 | Zhang et al. |
| 9,218,246 B2 | 12/2015 | Nagesharao et al. |
| 2006/0036830 A1 | 2/2006 | Dinechin et al. |
| 2008/0162483 A1 | 7/2008 | Becker et al. |
| 2012/0017114 A1 | 1/2012 | Timashev et al. |
| 2012/0151209 A1 | 6/2012 | Visnyak et al. |
| 2013/0007506 A1 | 1/2013 | Jain et al. |
| 2015/0074362 A1 | 3/2015 | Mohl |
| 2015/0370639 A1 | 12/2015 | He et al. |
| 2016/0055064 A1* | 2/2016 | Gostev ............... G06F 11/1448 726/4 |
| 2018/0129611 A1* | 5/2018 | Parker ................ G06F 12/0284 |

OTHER PUBLICATIONS

"Zerto Virtual Replication: A New Approach to Disaster Recovery", Retrieved on: May 9, 2016 Available at: http://www.zerto.com/pages/rs/zerto/images/Zerto-Virtual-Replication-for-Microsoft-Hyper-V-Datasheet.pdf.

Zhelyazkov, Stanislav, "Azure Site Recovery: Automatic VMM User Roles Assignment to VMs upon Failover", Published on: Nov. 24, 2014 Available at: http://www.systemcentercentral.com/azure-site-recovery-automatic-vmm-user-roles-assignment-to-vms-upon-failover/.

"EMC Disaster Recovery As a Service Solution", In White Paper of EMC Corporation, Jun. 2013, pp. 1-63.

"Securing Multi-Tenancy and Cloud Computing", In White Paper of Juniper Networks, Sep. 16, 2012, pp. 1-5.

"International Search Report and Written Opinion", Application No. PCT/US2017/029542, dated Jul. 5, 2017, 14 pages.

* cited by examiner

RECOVERY ENVIRONMENT FOR A VIRTUAL MACHINE

PRIORITY

This application claims priority under 35 U.S.C. Section 119(e) to U.S. Provisional Patent Application No. 62/330,745, filed May 2, 2016 and titled "Recovery Environment for a Virtual Machine," the entire disclosure of which is hereby incorporated by reference.

BACKGROUND

A virtual machine (VM) represents an emulation of a computer system and can be used to perform various tasks, such as to perform computing tasks in a dedicated computing environment. VMs can be implemented in various ways, such as locally generated VMs, remotely hosted VMs, and so forth. A VM that runs within a remotely hosted environment (e.g., a cloud environment) is typically accessed by its tenant over a network connection that functions within a guest operating system of the VM. One result of this is that misconfigurations or malfunctions within the guest operating system can render the VM unreachable by its tenant. Some host environments seek to provide virtual console access to such VMs to allow the tenants to recover them. Virtual console access, however, may pose networking and security issues. Further, some hosting environments may assist tenants with VM recovery however this is complicated and scales poorly. Thus, current VM recovery solutions suffer from a number of drawbacks, such as from the perspectives of security, scalability, and resource usage.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for a recovery environment for a virtual machine are described herein. Generally, a recovery environment provides a secure environment in which a damaged virtual machine can undergo repair procedures without compromising the security of the damaged virtual machine. In at least some implementations, a recovery environment represents an instance of a virtual machine that is executed to wrap a damaged virtual machine to enable the damaged virtual machine to be repaired.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for a recovery environment for a virtual machine are described herein. Generally, the techniques enable a cloud hosting environment to create a hypervisor host called a VM recovery environment that is, itself, a virtual machine. The virtual machine recovery environment can be leveraged to wrap a damaged virtual machine and provide a secure environment in which a recovery process can be performed in the damaged virtual machine. In at least some implementations, the virtual machine recovery environment is hosted by a VM host but owned by a tenant and effectively provides that tenant with console access to a hypervisor and complete control of all of the virtual machine recovery environment's assets. In implementations where the VM exists in an enhanced security environment which would normally block access to that VM from the VM host's environment, these controls are preserved by the virtual machine recovery environment thereby ensuring that the repair environment requires no reduction in security.

For instance, techniques described herein enable creation of a high-fidelity VM hosting environment within a VM that is owned by a tenant. This allows a tenant expanded access to a damaged VM and its assets while not requiring a host to allow the tenant any elevated, or privileged, access to the host's environment.

In at least some implementations, this represents a zero-copy model that allows the tenant-owned VM recovery environment to have access to assets such as virtual hard disk files without the need to perform additional copy operations which may be both expensive and slow. Further, VM tenants can have a recovery environment which has security protections of an original VM, thus mitigating the need for tenants to compromise security and isolation to enable recovery.

Accordingly, techniques for a recovery environment for a virtual machine described herein generate a virtual machine recovery environment that wraps a damaged VM and enables a damaged VM to lower its own access protections while the virtual machine recovery environment itself enforces the original access protections of the damaged VM. This enables various diagnostic and maintenance procedures to be performed on the damaged VM without exposing the damaged VM to unauthorized access by external parties, such as a VM host.

Example Environment

Figure 1:
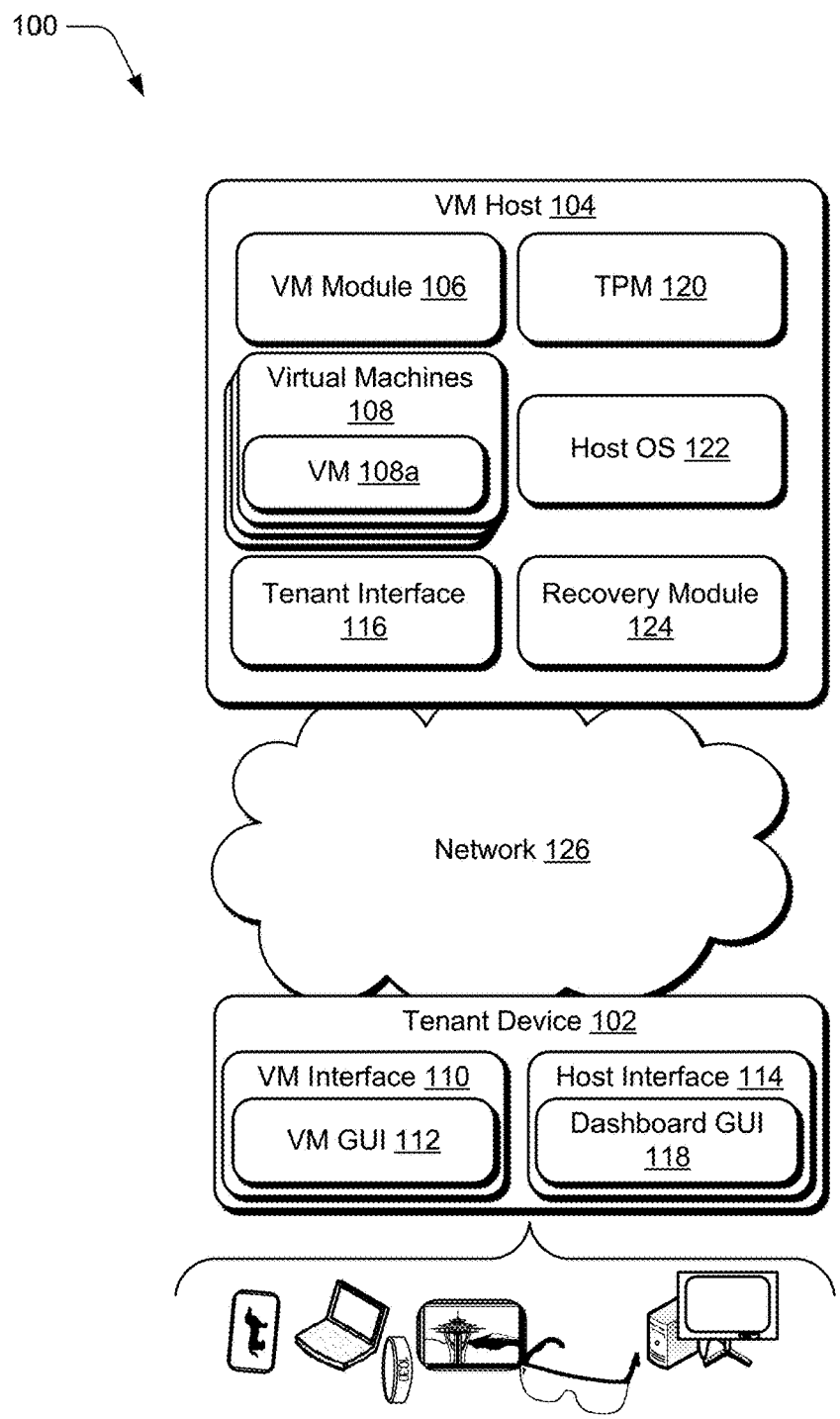
FIG. 1 is an illustration of an environment in an example implementation that is operable to employ techniques discussed herein in accordance with one or more embodiments.

FIG. 1 is an illustration of an environment 100 in an example implementation that is operable to employ techniques for a recovery environment for a virtual machine discussed herein. The environment 100 includes a tenant device 102 which can be embodied as any suitable device such as, by way of example and not limitation, a smartphone, a tablet computer, a portable computer (e.g., a laptop), a desktop computer, a wearable device, and so forth. One of a variety of different examples of the tenant device 102 is shown and described below in FIG. 12.

The environment 100 further includes a virtual machine ("VM") host 104, which is representative of a network-based service that includes a VM module 106 that is representative of functionality for implementing virtual machines ("VM") 108 for different devices, including the tenant device 102. Generally, the VM module 106 is representative of functionality to instantiate and manage instances of the VMs 108. In at least some implementations, the VM module 106 represents an instance of a hypervisor that runs on the VM host 104.

To enable a user of the tenant device 102 to interact with a VM 108 deployed by the VM host 104, the tenant device 102 includes a VM interface 110. According to various implementations, the VM interface 110 is representative of functionality that exposes a VM 108a to the tenant device 102. Generally, the VM 108a represents an instance of the VMs 108 hosted by the VM host 104. The VM interface 110, for instance, generates a graphical user interface (GUI) 112 via which a user may interact with the VM 108a, such as to provide input to the VM 108a and consume output from the VM 108a.

The tenant device 102 further includes a host interface 114, which is representative of functionality to enable the tenant device 102 to interface with the VM host 104 outside of the VM 108a. The host interface 114, for example, interfaces with a tenant interface 116 of the VM host 104. In at least some implementations, the tenant interface 116 represents an application-programming interface (API) and/ or other portal that enables communication between the tenant device 102 and the VM host 104. Thus, communication between the host interface 114 and the tenant interface 116 enables a user of the tenant device 102 to request that the VM host 104 instantiate the VM 108a for the tenant device 102. The host interface 114 also provides other functionality to the tenant device 102, such as enabling status of different VMs 108 to be viewed and/or manipulated. For instance, the host interface 114 presents a VM dashboard GUI 118 that displays status of different VMs 108 to which the tenant device 102 is permitted visibility. The VM dashboard 118, for example, indicates an operating status of the VM 108a, such as resources available to the VM 108a and a health status of the VM 108a.

Generally, the VM 108a represents a self-contained virtual operating environment that includes its own operating system, applications, data storage, interfaces, and so forth. Further, the VM 108a represents a shielded VM that is protected from access by the VM host 104. For instance, disks utilized by the VM 108a are encrypted such that the VM host 104 cannot access data utilized by the VM 108a "in the clear," e.g., in an unencrypted form. In at least some implementations, measures are taken by the VM 108a to ensure the integrity of the VM host 104, such as by interacting with a trusted platform module (TPM) 120 to perform a measured boot of code of an host operating system (OS) 122 utilized by the VM host 104 to ensure that the VM host 104 has not been tampered with by an unauthorized and/or malicious entity. Thus, the VM 108a represents a secure environment in which the tenant device 102 can perform various tasks and manipulate data without access by and visibility to the VM host 104.

Occasionally, an error event may occur that causes the VM 108a to malfunction. For instance, an error in code that runs the VM 108a may occur, a network connectivity problem between the tenant device 102 and the VM host 104 may occur, and so forth. The error event, for example, causes the VM 108a to be unresponsive to input to the tenant device 102. Accordingly, and as further detailed below, a recovery module 124 of the VM host 104 creates a recovery environment that enables the tenant device 102 to implement a maintenance procedure on the VM 108a to attempt to return the VM 108a to a normal operating status. The recovery module 124, for instance, represents functionality for performing various aspects of recovery environment for a virtual machine described herein.

In at least some implementations, when an error event occurs with the VM 108a, the tenant device 102 interfaces with the tenant interface 116 via the host interface 114 to request that a recovery environment be generated for the VM 108a. Accordingly, the host interface 114 represents a separate interface than the VM interface 110 such that communication between the host interface 114 and the tenant interface 116 remains operative (e.g., responsive) even if the VM 108a becomes unresponsive. Alternatively, or additionally, the VM host 104 (e.g., the VM module 106 and/or the recovery module 124) automatically detects an error condition in the VM 108a, and generates a recovery environment for the VM 108a.

As further detailed below, techniques for a recovery environment for a virtual machine described herein can be leveraged to generate a recovery environment for the VM 108a that enables security protections typically implemented by the VM 108a to be reduced and/or eliminated, while the recovery environment enforces the security protections to prevent access by external entities such as the VM host 104 to the VM 108a. Various maintenance and repair procedures can be performed within the recovery environment to attempt to repair and/or recover the damaged VM 108a. Further details concerning implementation and operation of a recovery environment for a virtual machine are presented below.

The environment 100 further includes a network 126 via which the tenant device 102 and the VM host 104 exchange data with one another. The network 126 may be implemented in various ways, such as a combination of different wired and/or wireless networks, e.g., the Internet. Alternatively or additionally, the network 126 may be implemented as a local network, such as a local area network (LAN), a corpnet, and so forth.

Having described an example environment in which the techniques described herein may operate, consider now a discussion of some example implementation scenarios in accordance with one or more embodiments. The implementation scenarios may be implemented in the environment 100 discussed above, the system 1200 described below, and/or any other suitable environment.

Figure 2:
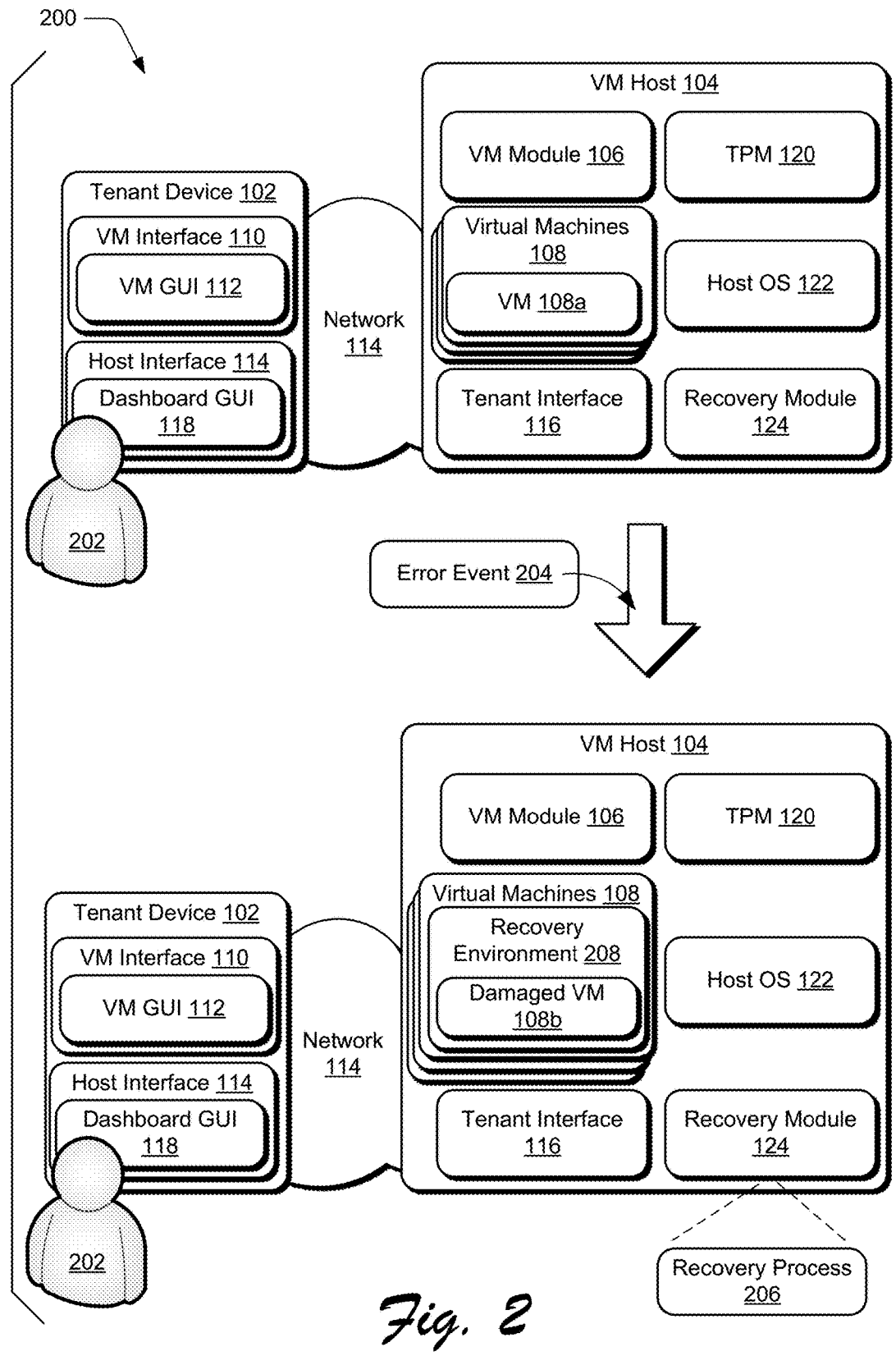
FIG. 2 depicts an example implementation scenario for generating a recovery environment for a virtual machine in accordance with one or more embodiments.

FIG. 2 depicts an example implementation scenario 200 for generating a recovery environment for a VM in accordance with one or more implementations. The scenario 200 includes the tenant device 102 and the VM host 104, introduced above. In the upper portion of the scenario 200, the VM 108*a* is generated for the tenant device 102. A user 202 of the tenant device 102, for example, interacts with the host interface 114 to request an instance of a VM. Alternatively or additionally, the host interface 114 initiates an automated process to request an instance of a VM, e.g., independent of a direct request from the user 202. Accordingly, the host interface 114 interacts with the VM module 106 via the tenant interface 116 of the VM host 104 to request an instance of a VM. Thus, the VM module 106 generates the VM 108*a*.

In at least some implementations, the VM 108*a* represents a shielded VM such that data exchanged between the tenant device 102 and the VM 108*a* is encrypted and non-accessible in an unencrypted form outside of the VM 108*a*. For instance, the tenant device 102 and the VM 108*a* have access to keys that can be used to encrypt and decrypt data that is exchanged between the tenant device 102 and the VM 108*a*. The keys, however, are not accessible to the VM host 104, and thus the VM host 104 cannot decrypt data exchanged between the VM 108*a* and the tenant device 102 in an unencrypted form.

Proceeding the lower portion of the scenario 200, an error event 204 occurs that causes the VM 108*a* to be unresponsive to the tenant device 102. For example, as a result of the error event 204, the VM interface 110 cannot access the VM 108*a*. Different events that can cause an unresponsive VM are discussed throughout this discussion. Thus, the unresponsive VM 108*a* is depicted as a damaged VM 108*b*, which represents the VM 108*a* in an unresponsive and/or otherwise damaged state. Accordingly, a recovery process 206 is initiated to attempt to restore the damaged VM 108*b* to a responsive state.

Generally, the recovery process 206 can be initiated in various ways. The user 202, for example, can detect that the VM 108*a* has become unresponsive and can initiate the recovery process 206. For instance, the user 202 can interact with the host interface 114, such as via the dashboard GUI 118, to notify the VM host 104 that the VM 108*a* is unresponsive and request that the recovery process 206 be initiated. In another implementation, the VM interface 110 detects that the VM 108*a* is unresponsive and notifies the host interface 114. In response, the host interface 114 interacts with the VM host 104 (e.g., via the tenant interface 116) to cause the recovery process 206 to be initiated. As yet another implementation, the VM host 104 itself can detect that the VM 108*a* is unresponsive (e.g., independent from a notification from the tenant device 102), and can initiate the recovery process 206.

As part of the recovery process 206, the recovery module 124 generates a recovery environment 208 that can be used to perform various diagnostic and repair procedures on the damaged VM 108*b* while protecting assets of the damaged VM 108*b* from unauthorized access. In at least some implementations, the recovery environment 208 is implemented as a separate VM that wraps the damaged VM 108*b* and enforces security protections on behalf of the damaged VM 108*b*. For instance, after the recovery environment 208 is created and the damaged VM 108*b* is embedded within the recovery environment 208, security protections normally enforced for the VM 108*a* can be reduced and/or eliminated to enable diagnostic and repair procedures to be performed on the damaged VM 108*b* within the context of the recovery environment 208. When the damaged VM 108*b* is placed within the recovery environment 208, for example, the damaged VM 108*b* still transitively attains the same level of protection even though it does not need to have the direct protection from the environment in which it runs, i.e., the recovery environment 208. To enable this, encryption keys or other secrets that are needed to access the damaged VM 108*b* outside of a protected environment can be made available within the recovery environment 208. The recovery environment 208 thus becomes trustworthy to access and work on the damaged VM 108*b*.

Thus, the recovery environment 208 enforces security protections at its perimeter to protect the damaged VM 108*b* from unauthorized access while security protections of the damaged VM 108*b* are reduced as part of the recovery process 206. The VM host 104, for example, is prevented from accessing data of the damaged VM 108*b* in the clear by security protections (e.g., encryption and decryption) applied by the recovery environment 208.

Figure 3:
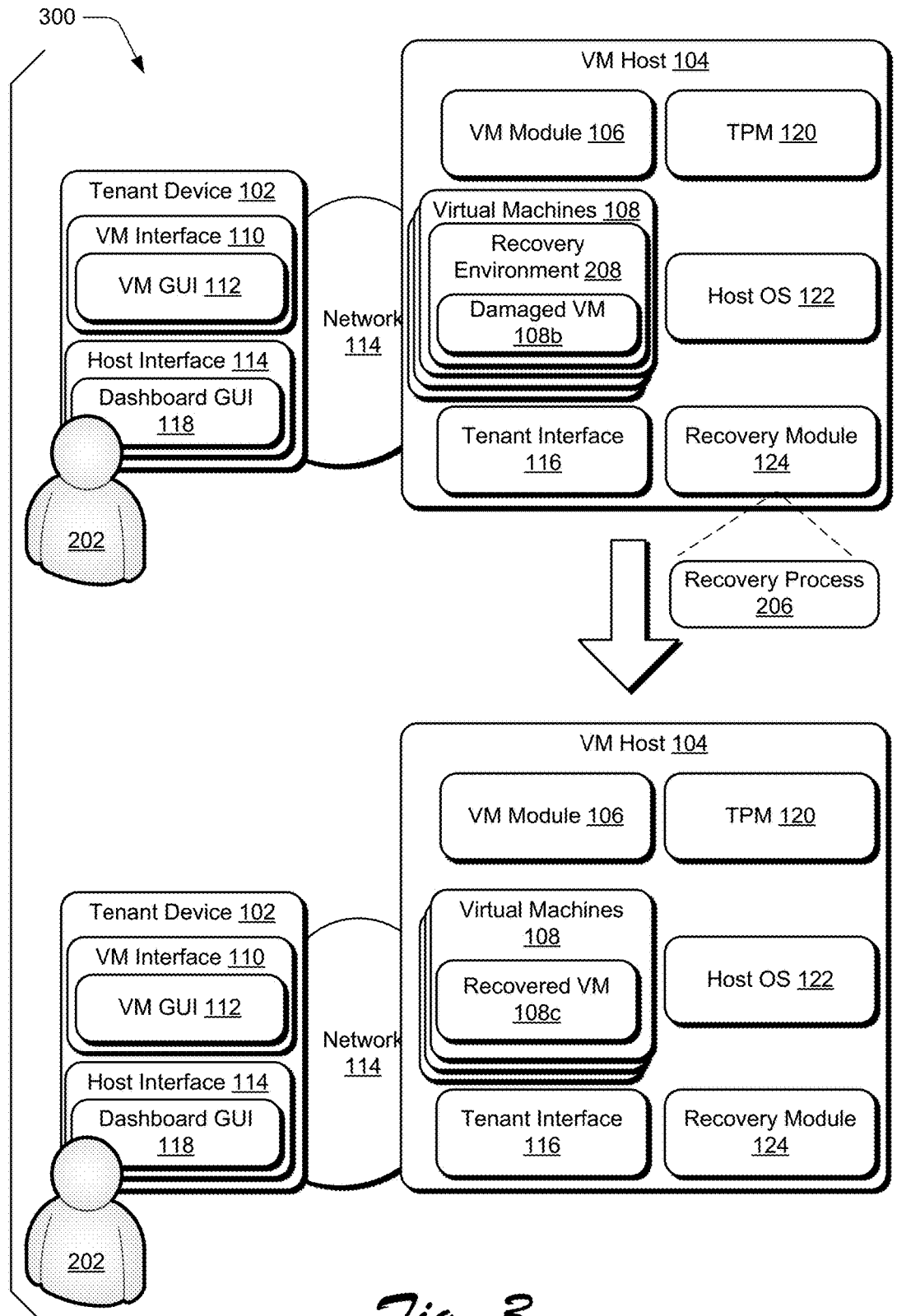
FIG. 3 depicts an example implementation scenario for returning a damaged virtual machine to a running state in accordance with one or more embodiments.

FIG. 3 depicts an example implementation scenario 300 for returning a damaged VM to a running state in accordance with one or more implementations. Generally, the scenario 300 represents a continuation of the scenario 200.

In the upper portion of the scenario 300, the damaged VM 108*b* is wrapped by the recovery environment 208 and the recovery process 206 is in progress. Example details of the recovery process 206 are presented later in this discussion.

Proceeding to the lower portion of the scenario 300, the damaged VM 108*b* is repaired via the recovery process 206 to generate a recovered VM 108*c*. Generally, the recovered VM 108*c* represents a repaired version of the original VM 108*a* and that is responsive to input from the VM interface 110. Accordingly, the recovery environment 208 is shut down and the recovered VM 108*c* is run on the VM host 104. In at least some implementations, the user 202 was performing a particular task on the VM 108*a* when the error event 204 occurred. Thus, the user 202 may resume the particular task using the recovered VM 108*c*, such as from a task state of the VM 108*a* that existed when the error event 204 occurred.

While the scenario 300 represents an implementation where the damaged VM 108*b* is able to be repaired and returned to service, it is to be appreciated that in some other implementations, the recovery process 206 may be unsuccessful in repairing the damaged VM 108*b*. If the recovery process 206 is not successful, one or more forensic processes may be implemented, such as to recover data stored in data storage used by the VM 108*a*, obtain data that indicates why the error event 204 occurred (e.g., a crash dump), and so forth.

The scenarios described above provide a general overview of techniques for a recovery environment for a virtual machine described herein. Consider now a discussion of detailed ways for performing various aspects of recovery environment for a virtual machine.

Figure 4:
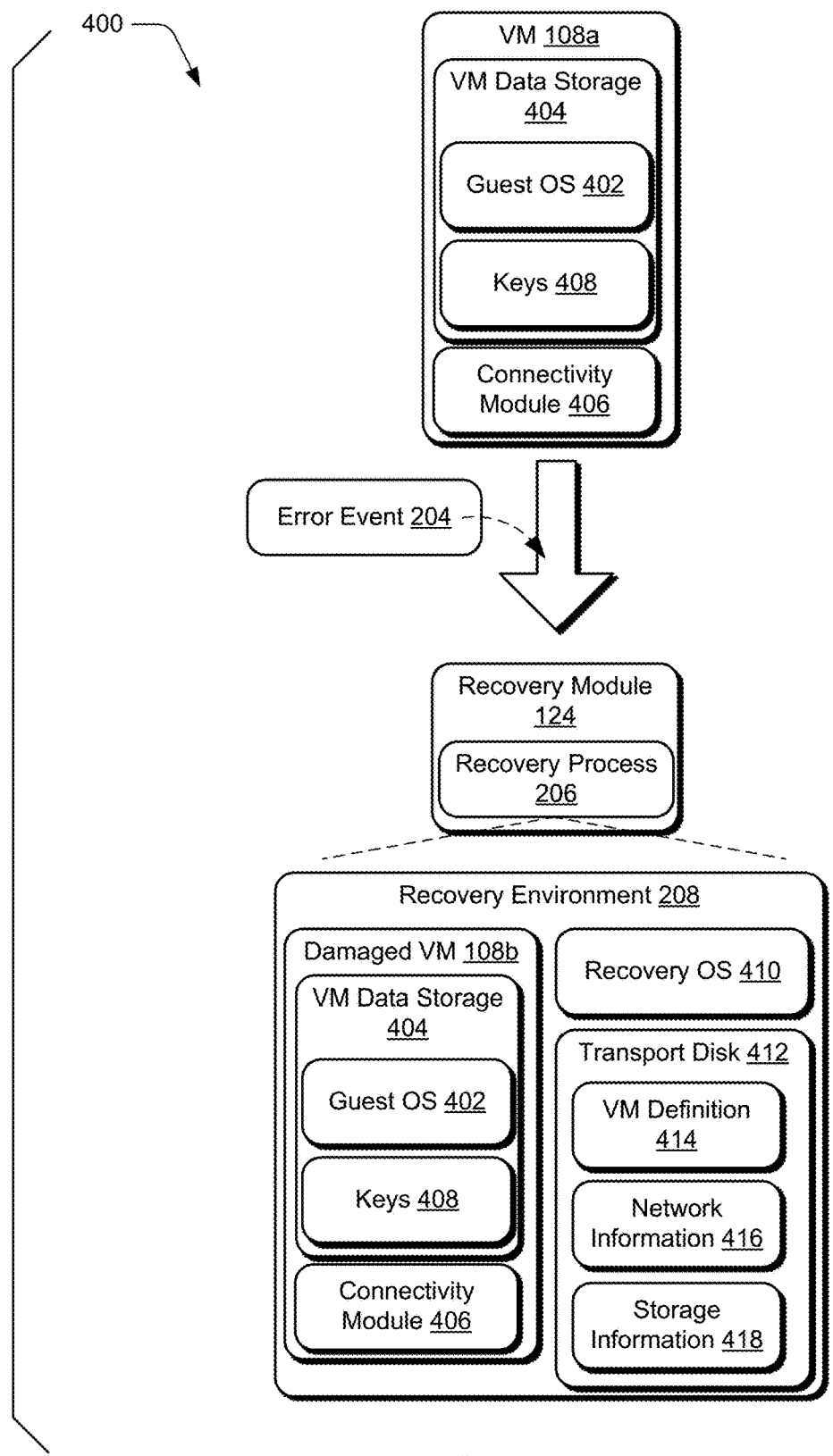
FIG. 4 depicts an example implementation scenario for generating a recovery environment for a damaged virtual machine in accordance with one or more embodiments.

FIG. 4 depicts a scenario 400 for generating a recovery environment for a damaged VM in accordance with one or more implementations. The scenario 400 includes the VM 108a and various attributes of the VM 108a, including a guest operating system (OS) 402 stored on a VM data storage 404, and a connectivity module 406. Generally, the guest OS 402 represents an OS that is initially generated by the VM host 104 and allocated to the VM 108a to enable the VM 108a to operate. The VM data storage 404 represents data storage on the VM host 104 that is allocated to the VM 108a. In at least some implementations, the VM data storage 404 represents virtual disks that are generated by the VM host 104 for the VM 108a.

The connectivity module 406 is representative of functionality to enable the VM 108a to access network connectivity such that data can be exchanged between the tenant device 102 and the VM 108a. The connectivity module 406, for example, includes data identifying virtual network switches and/or other network connectivity points to which the VM 108a is connected, such as for connectivity to the network 126.

Proceeding to the lower portion of the scenario 400, the error event 204 occurs which causes the VM 108a to become the damaged VM 108b. The damaged VM 108b, for instance, is unresponsive to communication from the tenant device 102. Examples of the error event 204 include:

Misconfiguration of the guest OS 402 preventing remote connectivity by the tenant device 102.

Misconfiguration of the VM 108a that prevents the guest OS 402 from booting.

Damage to the VM data storage 404 that renders the guest OS 402 unbootable and/or unresponsive.

Modifications or damage that prevents access to keys 408 and/or other assets that are required for operation of the VM 108a. Generally, the keys 408 represent keys (e.g., encryption keys) that can be used for various purposes, such as encrypting and decrypting data exchanged between the VM 108a and the tenant device 102, decrypting the guest OS 402, and so forth.

Accordingly, the recovery process 206 is initiated to generate the recovery environment 208 to provide a secure space in which repair of the damaged VM 108b can be attempted. The recovery process 206 can be initiated in various ways, such as in response to instruction from the host interface 114 to the tenant interface 116 indicating that the VM 108a is damaged, and requesting that the recovery environment 208 be created for the damaged VM 108b.

Further to the scenario 400, the recovery module 124 performs a set of actions to generate the recovery environment 208. The recovery module 124, for instance, determines various descriptive information about the VM 108a from the VM module 106, such as information to be used to generate the recovery environment 208.

In this particular example, the recovery module 124 creates a recovery operating system ("OS") 410 that represents an OS to be used to execute the recovery environment 208. In at least some implementations, the recovery OS 410 is an instance and/or copy of the host OS 122. For instance, the recovery OS 410 represents a streamlined version of the host OS 122 that omits certain components that are not needed to implement the recovery environment 208.

The recovery module 124 further creates a transport disk 412, which represents a virtual storage location that can be used to store various information for the recovery environment 208. The recovery module 124 then stores a VM definition 414 as part of the transport disk 412. Generally, the VM definition 414 includes various state information that defines attributes of the VM 108a, such as firmware state, VM settings, VM execution state at the time of the error event 204, and so forth. In at least some implementations, the VM definition 414 is obtained from the VM module 106. The recovery module 124 then enumerates network information that is pertinent to the damaged VM 108b, and writes this to the transport disk 412 as network information 416. The network information 416, for example, includes information from the connectivity module 406, such as identifiers for virtual network switches and switch extensions utilized by the VM 108a.

Further to the scenario 400, the recovery module 124 enumerates the VM data storage 404 of the damaged VM 108b to generate storage information 418. The storage information 418 includes various types of information, such as names (e.g., disk names) for the VM data storage 404, connectivity information for the VM data storage 404 (e.g., Small Computer System Interface (SCSI) bus number and target identifier, Integrated Drive Electronics (IDE) controller location, and so forth), disk location paths for disks included as part of the VM data storage 404, and so forth. The storage information 418 is then stored on the transport disk 412. As depicted in the following scenario, the recovery module 124 uses the transport disk 412 as part of instantiating the recovery environment 208.

Figure 5:
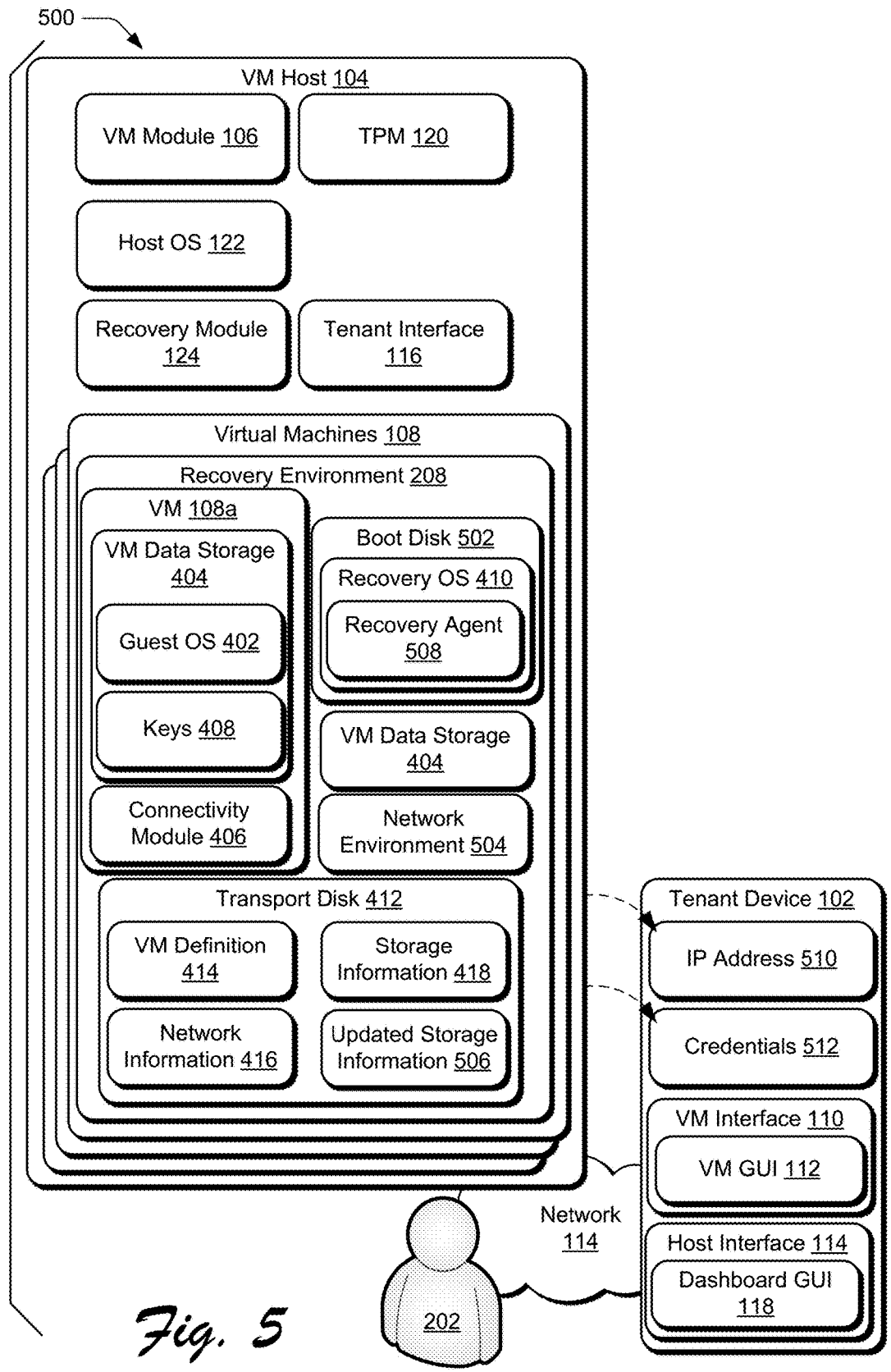
FIG. 5 depicts an example implementation scenario for instantiating a recovery environment in accordance with one or more embodiments.

FIG. 5 depicts an example implementation scenario 500 for instantiating a recovery environment in accordance with one or more implementations. The scenario 500 generally represents a continuation of the scenario 400 described above.

In the upper portion of the scenario 500, the recovery module 124 instantiates the recovery environment 208. As part of instantiating the recovery environment 208, the recovery module 124 connects a boot disk 502 that includes the recovery OS 410 to the recovery environment 208.

The recovery module 124 then applies the various information from the transport disk 412 to the recovery environment 208. For instance, the recovery module 124 uses the network information 416 to generate a network environment 504 for the recovery environment 208. Generally, the network environment 504 replicates various aspects of an original network environment of the VM 108a, such as to provide the recovery environment 208 with network connectivity to the tenant device 102. In at least some implementations, the network environment 504 includes virtual network switches that connect the recovery environment to a tenant-facing network to which the tenant device 102 is connected, such as the network 126 introduced above.

Further to the scenario 500, the recovery module 124 disconnects the VM data storage 404 from the damaged VM 108b and then connects the VM data storage 404 identified in the storage information 418 of the transport disk 412 to the recovery environment 208. The recovery module 124 then records the disk names and how the VM data storage 404 is connected to the recovery environment 208 (e.g., SCSI bus and target) as updated storage information 506 in the transport disk 412. Thus, the recovery environment 208 has access to the VM data storage 404 and data stored on the VM data storage 404. According to various implementations, disconnecting the VM data storage 404 from the damaged VM 108b and connecting the VM data storage 404 to the recovery environment 208 enables the recovery environment 208 to have access to the VM data storage 404 without requiring that data stored on the VM data storage 404 be copied to the recovery environment 208. Thus, techniques for a recovery environment for a virtual machine provide a "zero-copy" model that conserves system resources by not requiring that a disk of a damaged VM be copied in order for a recovery environment to have access to the disk.

The recovery module 124 then starts the recovery environment 208, which boots and executes using the recovery OS 410. In at least some implementations, the recovery module 124 performs no further interaction with the recovery environment 208 until the recovery module 124 is notified that repair procedures for the damaged VM 108b are finished and/or that the recovery environment 208 is shut down.

Accordingly, a recovery agent 508 (e.g., as part of the recovery OS 410) executes within the recovery environment 208 and performs various actions to enable the recovery environment 208 to execute and access various assets of the original VM 108a. The recovery agent 508, for example, enables the recovery environment 208 to access network connectivity defined by the network environment 504 and to access connectivity to the VM data storage 404. Further, state information from the VM definition 414 is mapped to the recovery environment 208 to cause various state information from the original VM 108a to be applied to the recovery environment 208.

The recovery environment 208 further includes an Internet Protocol (IP) address 510 and credentials 512 that enable the tenant device 102 to access the recovery environment 510. The recovery agent 508 thus communicates the IP address 510 and the credentials 512 to the tenant device 102. The recovery environment 208 is now in a running state that replicates various attributes of the original VM 108a. Further, the recovery environment 208 is accessible to the tenant device 102 via the IP address 510 and the credentials 512.

Figure 6:
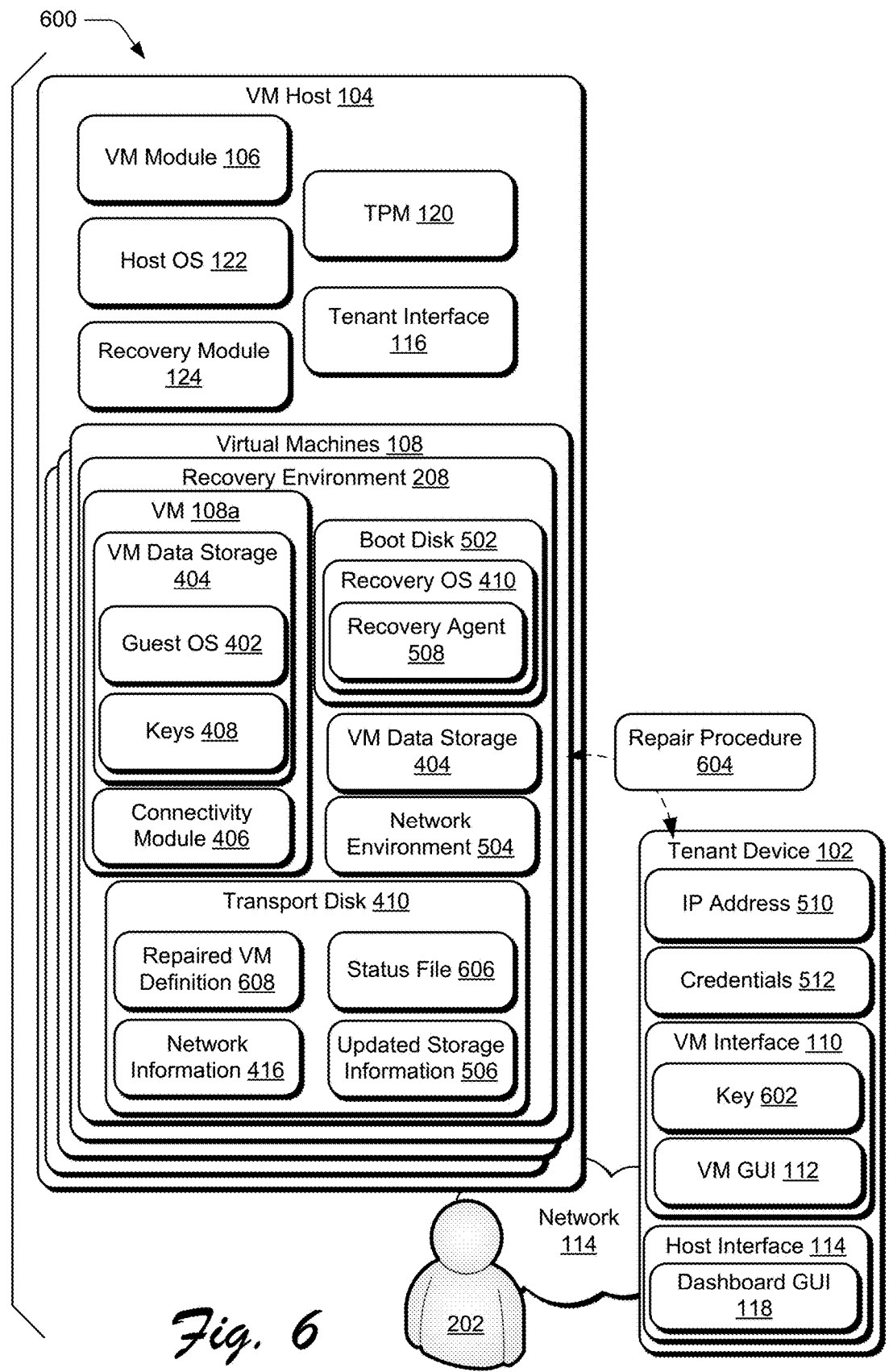
FIG. 6 depicts an example implementation scenario for attempting to repair a damaged virtual machine in accordance with one or more embodiments.

FIG. 6 depicts an example implementation scenario 600 for attempting to repair a damaged VM in accordance with one or more implementations. The scenario 600 generally represents a continuation of the scenario 500 described above.

In the scenario 600, the recovery environment 208 executes and has access to various attributes and resources of the original VM 108a, such as described above. Further, the tenant device 102 has access to the recovery environment 208 by connecting to the recovery environment 208 via the IP address 510, and authenticating with the recovery OS 410 via the credentials 512. In at least some implementations, the tenant device 102 has access to a key 602 that enables data exchanged between the recovery environment 208 and the tenant device 102 to be encrypted and decrypted. The VM host 104 does not have access to the key 602, and thus cannot decrypt encrypted data exchanged between the recovery environment 208 and the tenant device 102. Thus, such data is protected from access in an unencrypted form within the VM host 104 outside of the recovery environment 208.

Generally, the recovery environment 208 represents a tenant-owned VM that is accessible to the VM interface 110 of the tenant device 102. Thus, the VM interface 110 initiates a repair procedure 604 to attempt to return the damaged VM 108b to a functional (e.g., responsive) state. The repair procedure 604 can include various diagnostic and remedial actions, such as debugging code included as part of the VM definition 414 (e.g., kernel debugging of the guest OS 402), diagnostics on the VM data storage 404 (e.g., disk diagnostics), verifying that network settings of the network environment 504 are correct, data recovery of data stored on the VM data storage 404, and so forth.

In the scenario 600, the tenant device 102 identifies a source of the error event 204 and successfully repairs the damaged VM 108b. Generally, the repair can take various forms, such as debugging code of the damaged VM 108b, repairing a disk error on the VM data storage 404, correcting a network setting of the network environment 504, and so forth. Accordingly, the VM interface 110 writes a status file 606 that indicates a successful status of the repair procedure 604 to the transport disk 412. The VM interface 110 also writes a repaired VM definition 608 that defines a repaired version of the damaged VM 108b to the transport disk 412, along with other information needed to return the damaged VM 108b to a responsive state. The VM interface 110 can then initiate a shutdown of the recovery environment 208 such that a repaired version of the damaged VM 108b can be instantiated.

While the scenario 600 is discussed with reference to successfully repairing the damaged VM 108b, in other implementations the repair procedure 604 is not successful. If the repair procedure 604 is not successful, various procedures can be performed to minimize negative impact caused by the inability to access a repaired version of the damaged VM 108b. For instance, data recovery can be performed to attempt to recover data stored in the VM data storage 404 and store the data at another location, such as in a different, functional VM. Further, the VM data storage 404 can be erased to minimize risk of unauthorized access to data stored in the disks. If any errors in the damaged VM 108b were identified during the repair procedure 604, the errors can be written to a diagnostic file for future reference.

Figure 7:
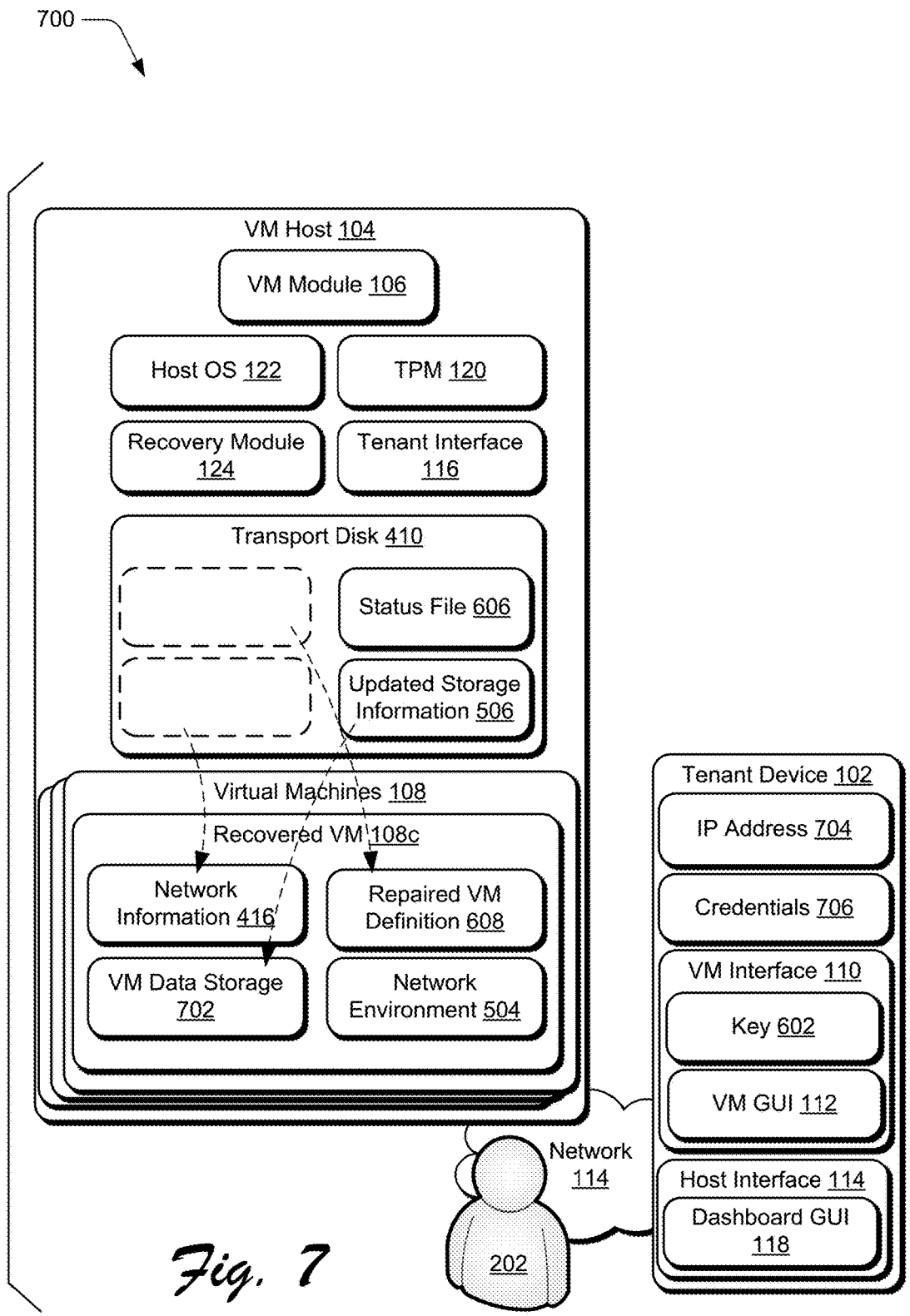
FIG. 7 depicts an example implementation scenario for returning a damaged virtual machine to a running state in accordance with one or more embodiments.

FIG. 7 depicts an example implementation scenario 700 for returning a damaged VM to a running state in accordance with one or more implementations. The scenario 700 generally represents a continuation of the scenario 600 described above.

In the scenario 700, the VM module 106 on the VM host 104 detects that the recovery environment 208 is shut down and/or that a repaired VM is available to be instantiated. The VM interface 110, for example, closes the recovery environment 208, and the VM module 106 detects that the recovery environment 208 is closed. Alternatively or additionally, the tenant device 102 notifies the VM module 106 that a recovered VM is available to be instantiated.

Accordingly, the VM module 106 accesses the transport disk 412 and reads the status file 606, which indicates that the repaired VM definition 608 is available to instantiate a repaired version of the damaged VM 108b. Alternatively, in an implementation where the repair procedure 604 is unsuccessful, the status file 606 can indicate that the damaged VM 108b was unable to be repaired. In such a scenario, the VM module 106 can discard the damaged VM 108b.

Further to the scenario 700, the VM module 106 generates the recovered VM 108c using information from the transport disk 412. For instance, the VM module 106 instantiates the recovered VM 108c and writes the repaired VM definition 608 to the recovered VM 108c. In at least some implementations, this overwrites the definition of the damaged VM 108b with the repaired VM definition 608. The VM module 106 then verifies that the repaired VM definition 608 complies with any VM policies enforced by the VM host 104, such as security policies that prevent unauthorized access by a VM to protected assets of the VM host 104.

To enable access to network connectivity originally used by the VM 108a, the VM module 106 connects the recovered VM 108c to one or more networks based on connectivity information specified in the network information 416. The VM module 106 then connects the recovered VM 108c to VM data storage 702 identified in the updated storage information 506. Generally, the VM data storage 702 is a version of the original VM data storage 404. In at least some implementations, the VM data storage 702 includes the same data and/or a copy of the data that was originally stored in the VM data storage 404. Alternatively or additionally, the VM data storage 702 represent a repaired version of the VM data storage 404. During the recovery process 206 the location of one or more of the VM data storage 404 may have changed, and thus the updated storage information 506 reflects any changes in location (e.g., disk location) such that the recovered VM 108c can be connected to the VM data storage 702.

Further to the scenario 700, the VM host communicates an IP address 704 and credentials 706 to the tenant device 102. Generally, the IP address 704 represents an address of the recovered VM 108c. Thus, the tenant device 102 can use the IP address 704 to access the location of the recovered VM 108c, and can use the credentials 706 to authenticate for access to the recovered VM 108c. Accordingly, the VM module 106 starts execution of the recovered VM 108c such that the tenant device 102 can interact with the recovered VM 108c. In at least some implementations, the tenant device 102 can resume a task that was being performed when the error event 204 occurred. The recovered VM 108c, for instance, begins executing at a state at which the original VM 108a was executing when the error event 204 occurred and/or when the VM 108a became unresponsive.

Figure 8:
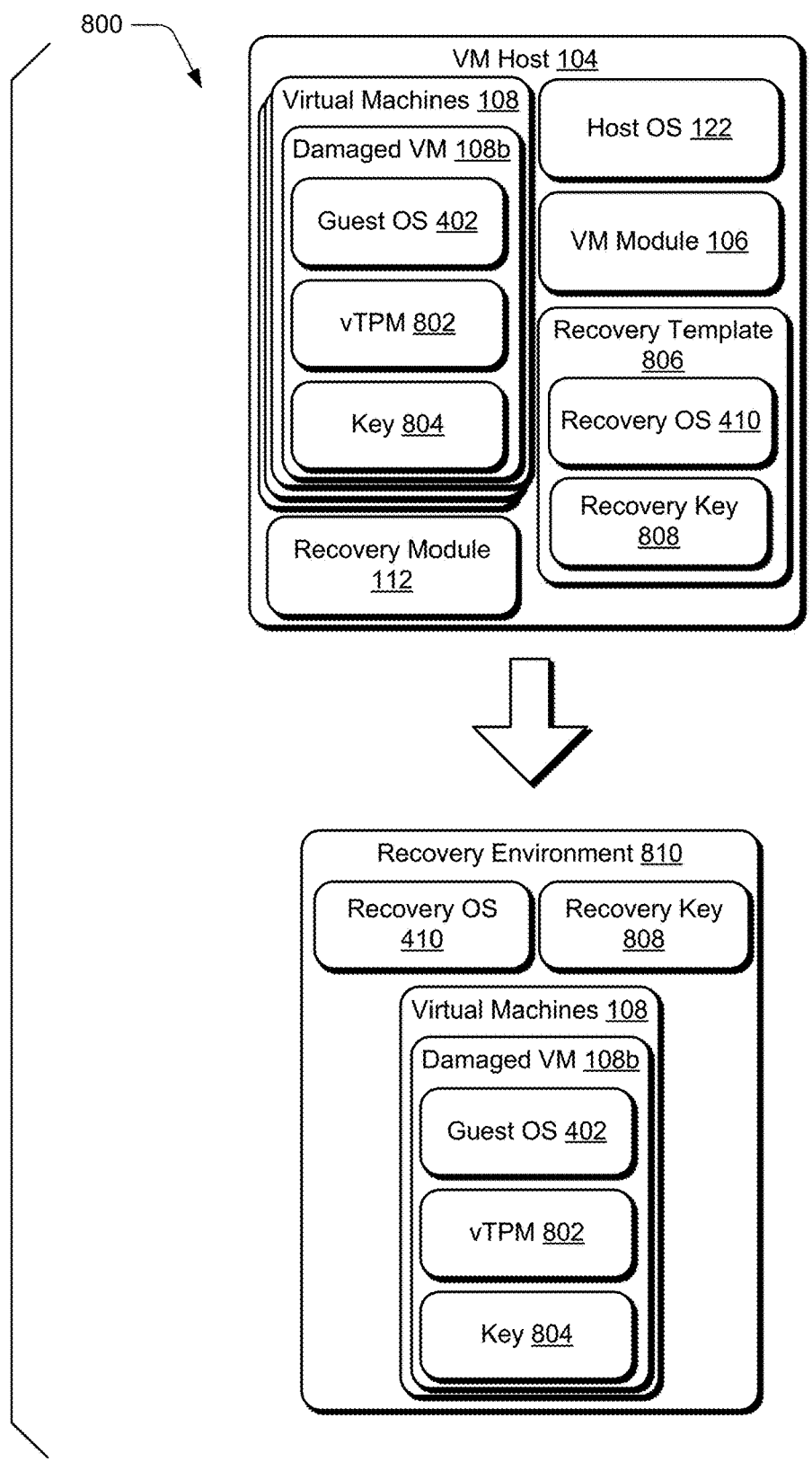
FIG. 8 depicts an example implementation scenario for generating a recovery environment for a shielded virtual machine in accordance with one or more embodiments.

FIG. 8 depicts an example implementation scenario 800 for generating a recovery environment for a shielded VM in accordance with one or more implementations. The scenario 800, for example, presents additional details that can be applied in the various scenarios described above.

The scenario 800 includes the damaged VM 108b described above. In this particular scenario, the damaged VM 108b includes the guest OS 402 and a virtual trusted platform module ("vTPM") 802 that is used to secure a key 804. The vTPM 802, for example, represents a virtual version of a hardware TPM that protects access to the key 804. Generally, the key 804 represents an encryption key that can be used to encrypt and decrypt data associated with the damaged VM 108b. The guest OS 402, for instance, is stored in an encrypted form. Thus, the key 804 can be used to decrypt the guest OS 402 to enable the guest OS 402 to execute. As discussed above, a party that does not have access to the key 804 (e.g., the VM host 104) cannot access data within the damaged VM 108b in an unencrypted form, and thus the damaged VM 108b is protected from unauthorized access.

To generate a recovery environment for the damaged VM 108b, the recovery module 124 uses a recovery template 806. Generally, the recovery template 806 represents data that describes an image of a virtual machine recovery environment that can be instantiated to create a recovery environment for the damaged VM 108b. In this particular example, the recovery template 806 includes the recovery OS 410 and a recovery key 808. The recovery OS 410, for instance, is stored in an encrypted form, and thus the recovery key 808 can be used to decrypt the recovery OS 410 to enable the recovery OS 410 to execute.

Proceeding to the lower portion of the scenario 800, the VM host 104 generates the recovery environment 208 based on the recovery template 806. In this particular example, the recovery environment 208 represents a shielded VM that executes using the recovery OS 410.

Further to the scenario 800, the recovery environment 208 leverages the vTPM 802 of the damaged VM 108b to secure and access the recovery key 808. The vTPM 802, for instance, includes an asset (e.g., another key) that enables the vTPM to unseal the recovery key 808 such that the recovery key 808 can be used to decrypt the recovery OS 410, thus enabling the recovery OS 410 to execute and implement various tasks for the recovery environment 208.

Once the recovery environment 208 is created and running, data protections for the damaged VM 108b can be reduced to enable various repair procedures to be performed, such as described above. For instance, the recovery environment 208 can instantiate the damaged VM 108b without its original data protections to allow the recovery environment 208 to have unimpeded access to data and functionality of the damaged VM 108b. In at least some implementations, if the original protections of the damaged VM 108b are damaged (e.g. a lost encryption key), the recovery environment 208 can still access the damaged VM 108b since the damaged VM 108b is instantiated without its original security protections, e.g., data encryption.

Data of the damaged VM 108b, for instance, can be accessed in an unencrypted form by the tenant device 102, while security protections are enforced by the recovery environment 208 to prevent data of the damaged VM 108b from being accessed in the clear by other entities, such as the VM host 104.

According to various implementations, the various aspects of the recovery procedures discussed in the previous scenarios above can be applied via the recovery environment 208 to attempt to recover the damaged VM 108b.

Having discussed some example implementation scenarios, consider now a discussion of some example procedures in accordance with one or more implementations.

The following discussion describes some example procedures for a recovery environment for a virtual machine in accordance with one or more implementations. The example procedures may be employed in the environment 100 of FIG. 1, the system 1200 of FIG. 12, and/or any other suitable environment. The procedures, for instance, represent example procedures for implementing aspects of the implementation scenarios described above. In at least some implementations, the steps described for the various procedures are implemented automatically and independent of user interaction.

Figure 9:
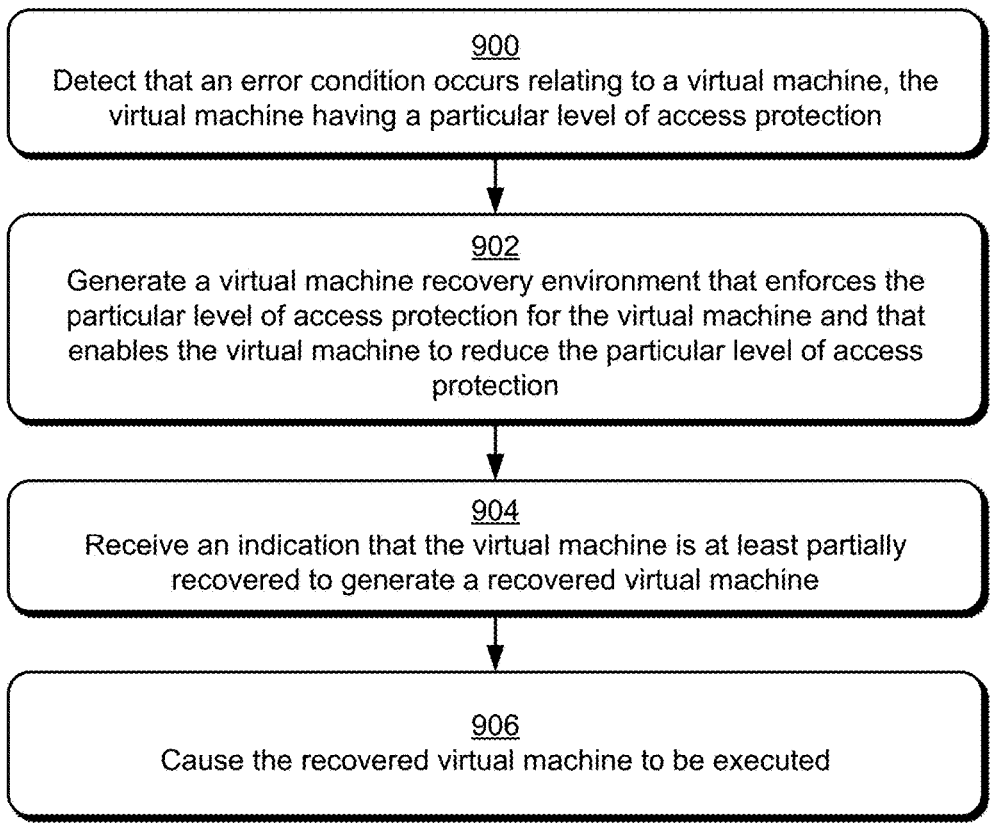
FIG. 9 is a flow diagram that describes steps in a method for recovering a damaged virtual machine in accordance with one or more embodiments.

FIG. 9 is a flow diagram that describes steps in a method in accordance with one or more implementations. The method describes an example procedure for recovering a damaged virtual machine in accordance with one or more implementations.

Step 900 detects that an error condition occurs relating to a virtual machine, the virtual machine having a particular level of access protection. The error condition may be detected by various entities, such as the tenant device 102, the VM host 104, and so forth. Examples of different error conditions and causes of error conditions are discussed above.

Step 902 generates a virtual machine recovery environment that enforces the particular level of access protection for the virtual machine and that enables the virtual machine to reduce the particular level of access protection. According to various implementations, the virtual machine recovery environment enforces the particular level of access protection for the virtual machine while the virtual machine undergoes a repair procedure.

Step 904 receives an indication that the virtual machine is at least partially recovered to generate a recovered virtual machine. The VM host 104, for example, receives the indication. Generally, the indication may occur in various ways, such as a notification from the tenant device 102, an indication that the recovery environment is shut down (e.g., stopped executing), and so forth.

Step 906 causes the recovered virtual machine to be executed. In at least some implementations, this includes writing a definition file that includes state information for the recovered VM to a storage location, and enabling the recovered VM to access the storage location effective to cause the recovered virtual machine to be execute at least in part using the definition file. The VM module 106, for instance, instantiates a virtual machine using recovered VM definition data generated for the recovered VM. The recovered VM definition data, for example, represents different state information specified for the recovered VM, such as OS state, OS settings, application settings, user-specific settings, devices that are available to the recovered VM, and so forth. In at least some implementations, the recovered VM definition data includes definition data from the original VM that experienced the error condition and that was recovered.

Generally, the recovered VM represents a recovered instance of the original damaged VM. A user, for instance, may resume a task on the recovered VM that was being performed on the original VM with the error event occurred.

Figure 10:
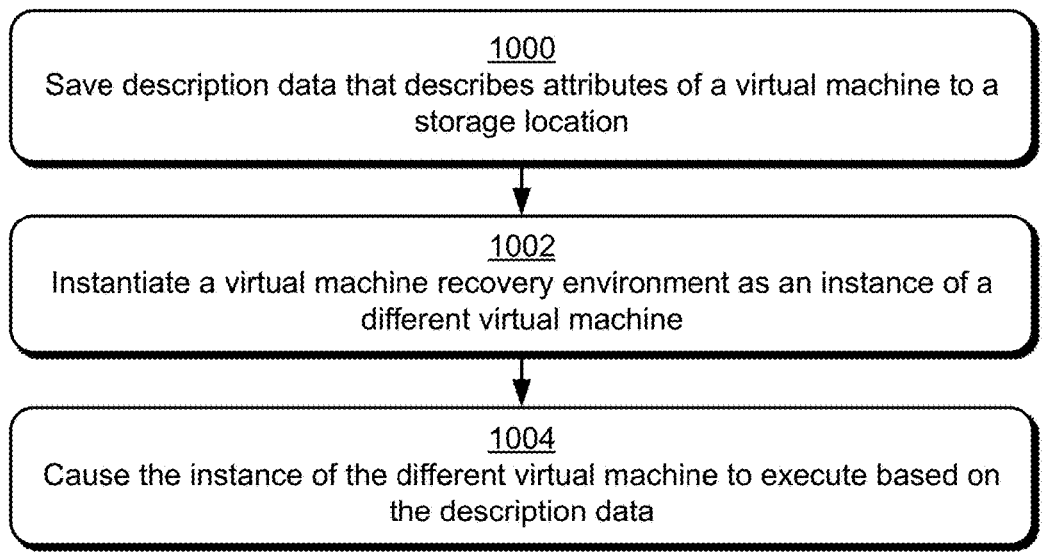
FIG. 10 is a flow diagram that describes steps in a method for generating a virtual machine recovery environment for a damaged virtual machine in accordance with one or more embodiments.

FIG. 10 is a flow diagram that describes steps in a method in accordance with one or more implementations. The method describes an example procedure for generating a virtual machine recovery environment for a damaged VM in accordance with one or more implementations.

Step 1000 saves description data that describes attributes of a virtual machine to a storage location. Generally, the attributes include various information about the damaged VM, such as definition data that defines a state of the VM, network information that defines network connectivity of the VM, storage information that identifies storage locations (e.g., virtual disk addresses) for the VM, and so forth.

Step 1002 instantiates a virtual machine recovery environment as an instance of a different virtual machine. The VM module 106, for example, generates the VM recovery environment as an instance of a different VM, such as using the description data to configure various aspects of the different VM.

Step 1004 causes the instance of the different virtual machine to execute based on the description data. Generally, this enables the VM recovery environment to have access to different assets of the damaged VM, such as network connectivity, storage locations and data stored in the storage locations, VM settings, and so forth.

As discussed above, the VM recovery environment enforces security protections that protect data of a damaged VM from being exposed in an unencrypted form to entities outside of the VM recovery environment, such as the VM host 104. For instance, the VM recovery environment 208 and the tenant device 102 include a set of keys that enable them to encrypt and decrypt data that is exchanged between them. In at least some implementations, this enables data of a damaged VM to be decrypted within the VM recovery environment such that various repair procedures can be performed on the damaged VM in an unencrypted state while protecting the unencrypted data from being exposed outside of the VM recovery environment.

Figure 11:
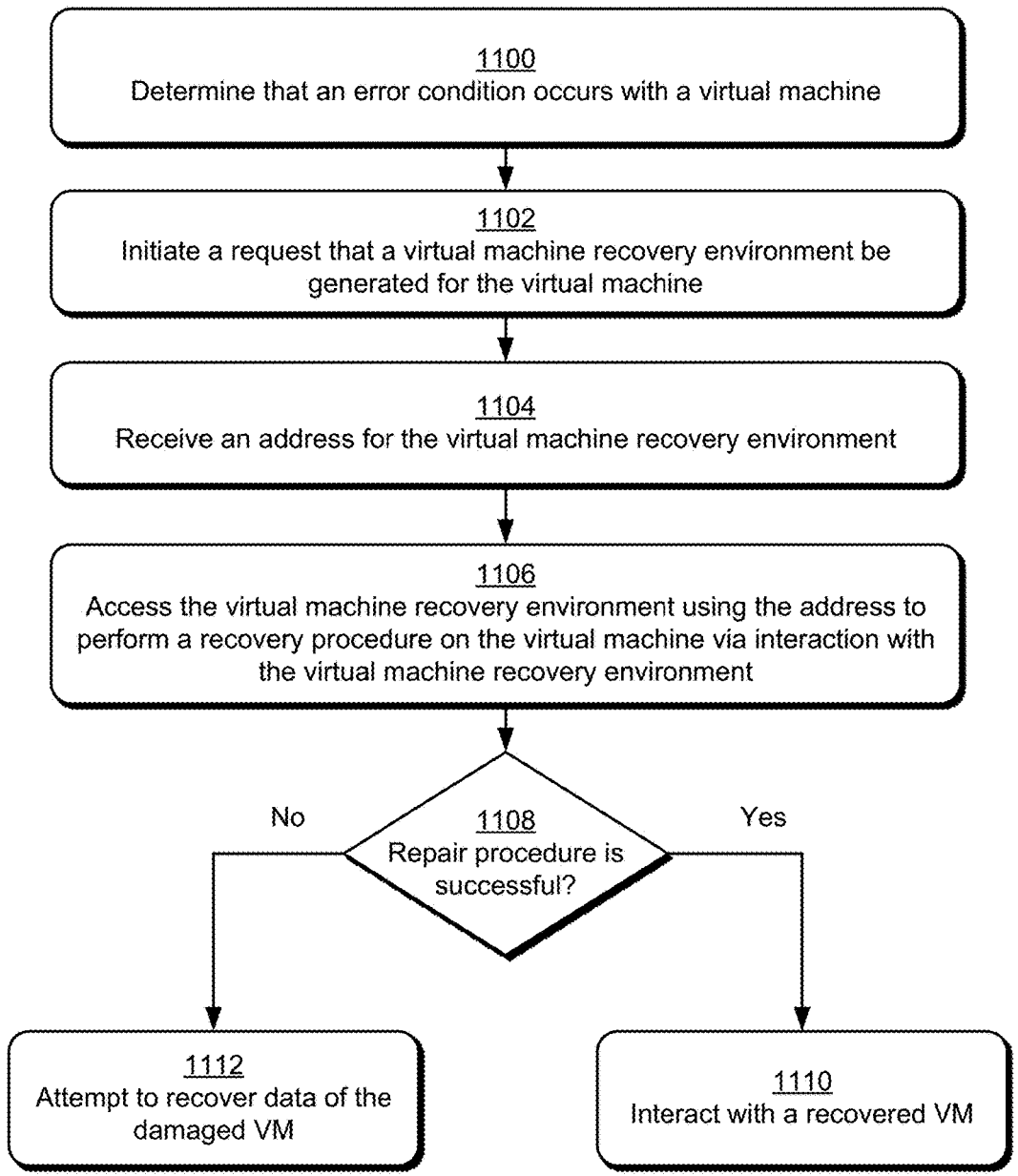
FIG. 11 is a flow diagram that describes steps in a method for performing a recovery procedure for a damaged virtual machine in accordance with one or more embodiments.

FIG. 11 is a flow diagram that describes steps in a method in accordance with one or more implementations. The method describes an example procedure for performing a recovery procedure for a damaged VM in accordance with one or more implementations.

Step 1100 determines that an error condition occurs with a virtual machine. The tenant device 102, for example, determines that a VM experiences an error condition. For instance, the VM becomes unresponsive to the tenant device 102. Alternatively or additionally, the VM host 104 detects an error condition with a VM.

Step 1102 initiates a request that a virtual machine recovery environment be generated for the virtual machine. In at least some implementations, the tenant device 102 requests that the VM host 104 instantiate a VM recovery environment, such as via interaction between the host interface 114 and the tenant interface 116. Alternatively or additionally, the VM host 104 initiates the request independent of a query from the tenant device 102. The VM host 104, for example, detects the error condition.

Step 1104 receives an address for the virtual machine recovery environment. For instance, the tenant device 102 receives a network address (e.g., an IP address) assigned by the VM host 104 to the VM recovery environment. In at least some implementations, the VM host 104 also communicates credentials to the tenant device 102 that are usable to authenticate with the VM recovery environment for access to the VM recovery environment. Examples of credentials include an authentication factor, a username, a password, a biometric factor, and so forth. The credentials may be encrypted such that the tenant device 102 and the VM recovery environment can decrypt the credentials using a key, but the VM host itself cannot.

Step 1106 accesses the virtual machine recovery environment using the address to perform a repair procedure on the virtual machine via interaction with the virtual machine recovery environment. In at least some implementations, the host interface 114 interacts with the VM recovery environment to perform various procedures to attempt to recover the damaged VM. Examples of different repair procedures are discussed above.

Step 1108 ascertains whether the repair procedure is successful. The tenant device 102, for example, determines whether the repair procedure is successful in recovering the damaged VM, such as generating a recovered VM that represents a repaired and executable version of the damaged VM.

If the repair procedure is successful ("Yes"), step 1110 interacts with a recovered VM. The VM host 104, for example, executes the recovered VM, and enables the tenant device 102 to interact with the recovered VM via the VM interface 110. In at least some implementations, this includes the VM host 104 communicating a network address and credentials for the recovered VM to the tenant device 102.

If the repair procedure is not successful ("No"), step 1112 attempts to recover data of the damaged VM. The tenant device 102, for example, attempts to recover data from a storage location of the damaged VM, and store the data in a different storage location (e.g., storage disk) that is accessible to the tenant device 102. In at least some implementations, the tenant device 102 causes the damaged VM to be erased to avoid exposing data of the damaged VM to an unauthorized entity, such as the VM host 104.

Accordingly, techniques for a recovery environment for a virtual machine described herein provide ways for recovering a damaged virtual machine, while protecting the damaged virtual machine from unauthorized access and tampering.

Having discussed some example procedures, consider now a discussion of an example system and device in which techniques for a recovery environment for a virtual machine may be implemented in accordance with one or more embodiments.

Example System and Device

Figure 12:
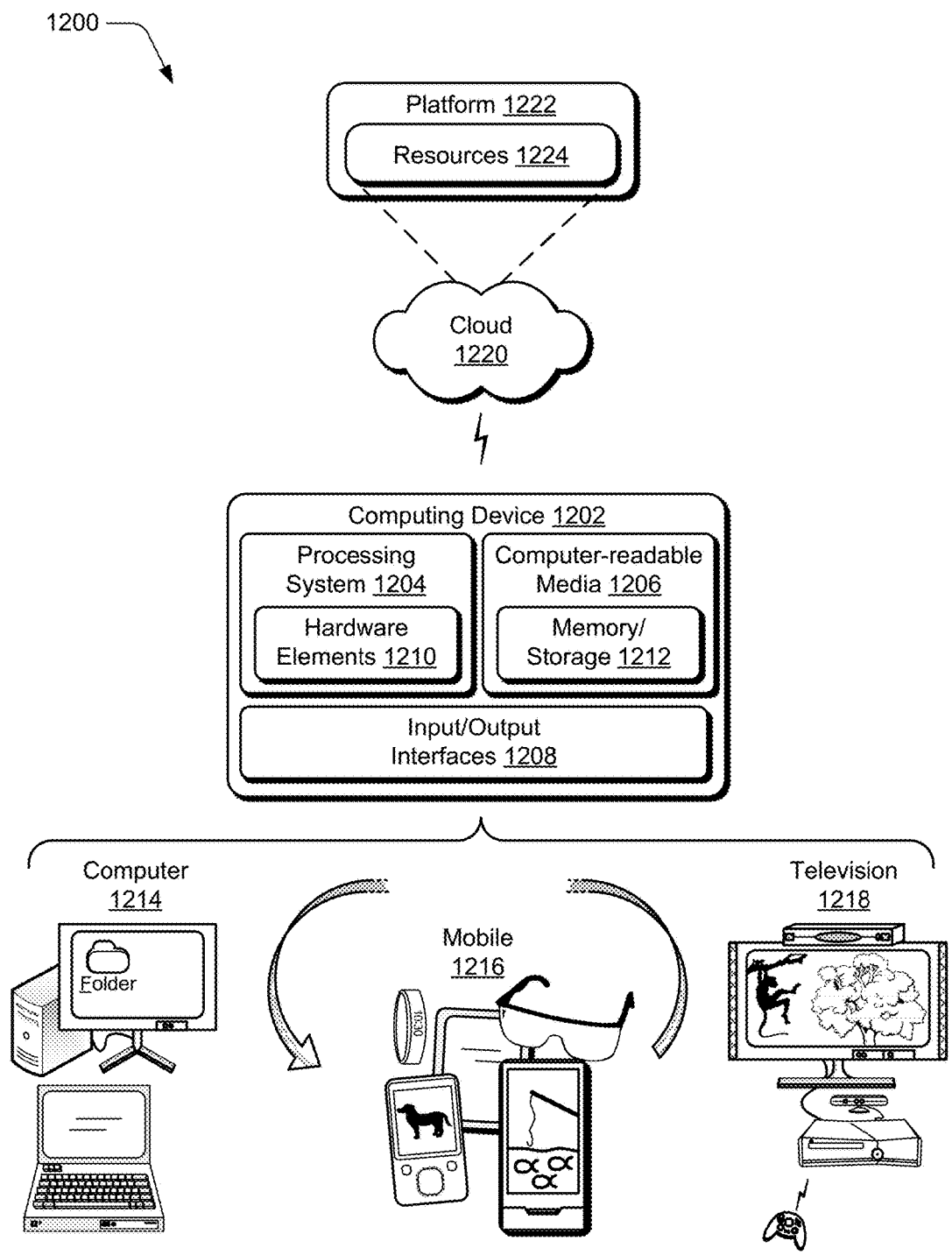
FIG. 12 illustrates an example system and computing device as described with reference to FIG. 1, which are configured to implement embodiments of techniques described herein.

FIG. 12 illustrates an example system generally at 1200 that includes an example computing device 1202 that is representative of one or more computing systems and/or devices that may implement various techniques described herein. For example, the tenant device 102 and/or the VM host 104 discussed above with reference to FIG. 1 can be embodied as the computing device 1202. The computing device 1202 may be, for example, a server of a service provider, a device associated with the client (e.g., a client device), an on-chip system, and/or any other suitable computing device or computing system.

The example computing device 1202 as illustrated includes a processing system 1204, one or more computer-readable media 1206, and one or more Input/Output (I/O) Interfaces 1208 that are communicatively coupled, one to another. Although not shown, the computing device 1202 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1204 is representative of functionality to perform one or more operations using hardware. Accordingly, the processing system 1204 is illustrated as including hardware element 1210 that may be configured as processors, functional blocks, and so forth. This may include implementation in hardware as an application specific integrated circuit or other logic device formed using one or more semiconductors. The hardware elements 1210 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 1206 is illustrated as including memory/storage 1212. The memory/storage 1212 represents memory/storage capacity associated with one or more computer-readable media. The memory/storage 1212 may include volatile media (such as random access memory (RAM)) and/or nonvolatile media (such as read only memory (ROM), Flash memory, optical disks, magnetic disks, and so forth). The memory/storage 1212 may include fixed media (e.g., RAM, ROM, a fixed hard drive, and so on) as well as removable media (e.g., Flash memory, a removable hard drive, an optical disc, and so forth). The computer-readable media 1206 may be configured in a variety of other ways as further described below.

Input/output interface(s) 1208 are representative of functionality to allow a user to enter commands and information to computing device 1202, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 1202 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," "entity," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1202. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Computer-readable storage media do not include signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1202, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 1210 and computer-readable media 1206 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 1210. The computing device 1202 may be configured to implement particular instructions and/or functions corresponding to the software and/or hardware modules. Accordingly, implementation of modules that are executable by the computing device 1202 as software may be achieved at least partially in hardware, e.g., through use of computer-readable storage media and/or hardware elements 1210 of the processing system. The instructions and/or functions may be executable/operable by one or more articles of manufacture (for example, one or more computing devices 1202 and/or processing systems 1204) to implement techniques, modules, and examples described herein.

As further illustrated in FIG. 12, the example system 1200 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1200, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1202 may assume a variety of different configurations, such as for computer 1214, mobile 1216, and television 1218 uses. Each of these configurations includes devices that may have generally different constructs and capabilities, and thus the computing device 1202 may be configured according to one or more of the different device classes. For instance, the computing device 1202 may be implemented as the computer 1214 class of a device that includes a personal computer, desktop computer, a multi-screen computer, laptop computer, netbook, and so on.

The computing device 1202 may also be implemented as the mobile 1216 class of device that includes mobile devices, such as a mobile phone, portable music player, portable gaming device, a tablet computer, a wearable device, a multi-screen computer, and so on. The computing device 1202 may also be implemented as the television 1218 class of device that includes devices having or connected to generally larger screens in casual viewing environments. These devices include televisions, set-top boxes, gaming consoles, and so on.

The techniques described herein may be supported by these various configurations of the computing device 1202 and are not limited to the specific examples of the techniques described herein.

The cloud 1220 includes and/or is representative of a platform 1222 for resources 1224. The platform 1222 abstracts underlying functionality of hardware (e.g., servers) and software resources of the cloud 1220. The resources 1224 may include applications and/or data that can be utilized while computer processing is executed on servers that are remote from the computing device 1202. Resources 1224 can also include services provided over the Internet and/or through a subscriber network, such as a cellular or Wi-Fi network.

The platform 1222 may abstract resources and functions to connect the computing device 1202 with other computing devices. The platform 1222 may also serve to abstract scaling of resources to provide a corresponding level of scale to encountered demand for the resources 1224 that are implemented via the platform 1222. Accordingly, in an interconnected device embodiment, implementation of functionality described herein may be distributed throughout the system 1200. For example, the functionality may be implemented in part on the computing device 1202 as well as via the platform 1222 that abstracts the functionality of the cloud 1220. In at least some implementations, functionality for a recovery environment for a virtual machine described herein can be implemented over the cloud 1220, such as by the platform 1222 and the resources 1224.

Discussed herein are a number of methods that may be implemented to perform techniques discussed herein. Aspects of the methods may be implemented in hardware, firmware, or software, or a combination thereof. The methods are shown as a set of steps that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

Techniques for a recovery environment for a virtual machine are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

In the discussions herein, various different embodiments are described. It is to be appreciated and understood that each embodiment described herein can be used on its own or in connection with one or more other embodiments described herein. Further aspects of the techniques discussed herein relate to one or more of the following embodiments.

A system comprising: one or more processors; and one or more computer-readable storage media storing computer-executable instructions that, responsive to execution by the one or more processors, cause the system to perform operations including: detecting that an error condition occurs relating to a virtual machine, the virtual machine having a particular level of access protection; and generating a virtual machine recovery environment that enforces the particular level of access protection for the virtual machine and that enables the virtual machine to reduce the particular level of access protection, the virtual machine recovery environment enforcing the particular level of access protection for the virtual machine while the virtual machine undergoes a repair procedure.

In addition to any of the above described systems, any one or combination of: wherein the virtual machine recovery environment comprises a different instance of a virtual machine; wherein the virtual machine and the virtual machine recovery environment are hosted by a network-based service, the virtual machine is generated for a tenant device remote from the network-based service, and the virtual machine recovery environment is accessible to the tenant device; wherein the virtual machine and the virtual machine recovery environment are hosted by a network-based service, the virtual machine is generated for a tenant device remote from the network-based service, the virtual machine recovery environment is accessible to the tenant device, and the network-based service is prevented from accessing data of the virtual machine and the virtual machine recovery environment in an unencrypted form; wherein the virtual machine includes a virtual storage location, and wherein said generating the virtual machine recovery environment enables the virtual machine recovery environment to connect to the virtual storage location without copying data of the virtual storage location to the virtual machine recovery environment; wherein the virtual machine and the virtual machine recovery environment are hosted by a network-based service, the virtual machine is generated for a tenant device remote from the network-based service, and wherein said detecting comprises receiving an indication of the error event from the tenant device; wherein said generating the virtual machine recovery environment comprises: saving description data that describes attributes of the virtual machine to a storage location; instantiating the virtual machine recovery environment as a different virtual machine; and causing the storage location to be accessible to the different virtual machine such that the different virtual machine can execute based on one or more of the attributes of the virtual machine to implement the virtual machine recovery environment; wherein said generating the virtual machine recovery environment comprises: saving description data that describes attributes of the virtual machine to a storage location, the attributes including network information and storage information for the virtual machine; instantiating the virtual machine recovery environment as a different virtual machine; and causing network connectivity identified in the network information to be accessible to the different virtual machine, and the storage location to be accessible to the different virtual machine such that the different virtual machine can execute based on one or more of the attributes of the virtual machine to implement the virtual machine recovery environment.

A method comprising: detecting that an error condition occurs relating to a virtual machine, the virtual machine having a particular level of access protection; generating a virtual machine recovery environment that enforces the particular level of access protection for the virtual machine and that enables the virtual machine to reduce the particular level of access protection, the virtual machine recovery environment enforcing the particular level of access protection for the virtual machine while the virtual machine undergoes a repair procedure; receiving an indication that the virtual machine is at least partially recovered to generate a recovered virtual machine; and causing the recovered virtual machine to be executed.

In addition to any of the above described methods, any one or combination of: wherein said detecting comprises receiving a notification of the error condition from a tenant device associated with the virtual machine; wherein said generating the virtual machine recovery environment comprises causing the virtual machine recovery environment to have access to network connectivity defined for the virtual machine; wherein said generating the virtual machine recovery environment comprises: saving description data that describes attributes of the virtual machine to a storage location; instantiating the virtual machine recovery environment as a different virtual machine; and causing the storage location to be accessible to the different virtual machine such that the different virtual machine can execute based on one or more of the attributes of the virtual machine to implement the virtual machine recovery environment; wherein said generating the virtual machine recovery environment comprises: saving description data that describes attributes of the virtual machine to a storage location, the attributes including network information and storage information for the virtual machine; instantiating the virtual machine recovery environment as a different virtual machine; and causing the storage location to be accessible to the different virtual machine such that the different virtual machine can execute based on one or more of the attributes of the virtual machine to implement the virtual machine recovery environment; wherein the indication that the virtual machine is at least partially recovered comprises an indication that the virtual machine recovery environment is shut down; wherein said causing the recovered virtual machine to be executed comprises instantiating the recovered virtual machine and causing the recovered virtual machine to execute using a repaired virtual machine definition generated for the recovered virtual machine; wherein said causing the recovered virtual machine to be executed comprises instantiating the recovered virtual machine and causing the recovered virtual machine to execute using: a repaired virtual machine definition generated for the recovered virtual machine; and a data storage location that was previously allocated to the virtual machine prior to the error condition; further comprising: writing a definition file that includes state information for the recovered virtual machine to a storage location; and enabling the recovered virtual machine to access the storage location effective to cause the recovered virtual machine to be execute at least in part using the definition file.

A method comprising: determining that an error condition occurs with a virtual machine; initiating a request that a virtual machine recovery environment be generated for the virtual machine; receiving an address for the virtual machine recovery environment; and accessing the virtual machine recovery environment using the address to perform a repair procedure on the virtual machine via interaction with the virtual machine recovery environment.

In addition to any of the above described methods, any one or combination of: further comprising receiving credentials, and authenticating using the credentials for access to the virtual machine recovery environment; wherein said initiating comprises communicating the request to a remote service, and wherein the address for the virtual machine comprises an Internet Protocol (IP) address for the virtual machine received from the remote service.

What is claimed is:

1. A system comprising:
one or more processors; and
one or more computer-readable storage media storing computer-executable instructions that, responsive to execution by the one or more processors, cause the system to perform operations including:
detecting that an error condition occurs relating to a virtual machine, the virtual machine having a particular level of access protection; and
configuring a recovery virtual machine that enforces the particular level of access protection for the virtual machine and that enables the virtual machine to reduce the particular level of access protection while executing within the recovery virtual machine, the recovery virtual machine enforcing the particular level of access protection for the virtual machine while the virtual machine executing therein undergoes a repair procedure.

2. A system as described in claim 1, wherein the virtual machine and the recovery virtual machine are hosted by a network-based service, the virtual machine is generated for a tenant device remote from the network-based service, and the recovery virtual machine is accessible to the tenant device.

3. A system as described in claim 1, wherein the virtual machine and the recovery virtual machine are hosted by a network-based service, the virtual machine is generated for a tenant device remote from the network-based service, the recovery virtual machine is accessible to the tenant device, and the network-based service is prevented from accessing data of the virtual machine and the recovery virtual machine in unencrypted form.

4. A system as described in claim 1, wherein the virtual machine includes a virtual storage location, and wherein said configuring the recovery virtual machine enables the recovery virtual machine to connect to the virtual storage location without copying data of the virtual storage location to the recovery virtual machine.

5. A system as described in claim 1, wherein the virtual machine and the recovery virtual machine are hosted by a network-based service, the virtual machine is generated for a tenant device remote from the network-based service, and wherein said detecting comprises receiving an indication of the error event from the tenant device.

6. A system as described in claim 1, wherein said configuring the recovery virtual machine comprises:
saving description data that describes attributes of the virtual machine to a storage location;
instantiating the recovery virtual machine; and
causing the storage location to be accessible to the recovery virtual machine such that the recovery virtual machine can execute based on one or more of the attributes of the virtual machine.

7. A system as described in claim 1, wherein said configuring the recovery virtual machine comprises:
saving description data that describes attributes of the virtual machine to a storage location, the attributes including network information and storage information for the virtual machine; and
causing network connectivity identified in the network information to be accessible to the recovery virtual machine, and the storage location to be accessible to the recovery virtual machine such that the recovery virtual machine can execute based on one or more of the attributes of the virtual machine to implement the recovery virtual machine.

8. A method comprising:
detecting that an error condition occurs relating to a virtual machine executed by a hypervisor executing on a host, the virtual machine having a particular level of access protection secured by a secure key, wherein particular level of access protection secures access to the virtual machine prior to the error condition occurring;
based on the detecting of the error condition, configuring a recovery virtual machine recovery that is executed by the hypervisor and that enforces the particular level of access protection for the virtual machine while executing within the recovery virtual machine, wherein the virtual machine is reconfigured to disable or reduce the particular level of access protection while executing within the recovery virtual machine, the recovery virtual machine enforcing the particular level of access protection for the virtual machine while the virtual machine undergoes a repair procedure while executing within the recovery virtual machine; and
receiving an indication that the virtual machine is at least partially recovered, and based thereon causing the at least partially recovered virtual machine to be executed by the hypervisor and not the recovery virtual machine.

9. A method comprising as recited in claim 8, wherein said detecting comprises receiving a notification of the error condition from a tenant device associated with the virtual machine.

10. A method as recited in claim 8, wherein said configuring the recovery virtual machine comprises causing the recovery virtual machine to have access to network connectivity defined for the virtual machine.

11. A method as recited in claim 8, wherein said generating the recovery virtual machine comprises:
saving description data that describes attributes of the virtual machine to a storage location; and
causing the storage location to be accessible to the recovery virtual machine such that the recovery virtual machine can execute based on one or more of the attributes of the virtual machine to implement the recovery virtual machine.

12. A method as recited in claim 8, wherein said configuring the recovery virtual machine comprises:
saving description data that describes attributes of the virtual machine to a storage location, the attributes including network information and storage information for the virtual machine; and
causing the storage location to be accessible to the recovery virtual machine such that the recovery virtual machine can execute based on one or more of the attributes of the virtual machine.

13. A method as recited in claim 8, wherein the recovery virtual machine secures access to the VM using the secure key.

14. A method as recited in claim 8, wherein said causing the recovered virtual machine to be executed comprises instantiating the recovered virtual machine and causing the recovered virtual machine to execute using a repaired virtual machine definition generated for the recovered virtual machine.

15. A method as recited in claim 8, wherein said causing the recovered virtual machine to be executed comprises causing the recovered virtual machine to execute using:
a repaired virtual machine definition generated for the recovered virtual machine; and
a data storage location that was previously allocated to the virtual machine prior to the error condition.

16. A method as recited in claim 8, further comprising:
writing a definition file that includes state information for the recovered virtual machine to a storage location; and
enabling the recovered virtual machine to access the storage location effective to cause the recovered virtual machine to be execute at least in part using the definition file.

17. A method comprising:
determining that an error condition occurs with a virtual machine;
initiating a request that a recovery virtual machine be configured for executing the virtual machine;
receiving a network address for the recovery virtual machine; and
accessing the recovery virtual machine using the network address to perform a repair procedure on the virtual machine via interaction with the recovery virtual machine executing the virtual machine therein.

18. A method as recited in claim 17, the configuring comprising receiving credentials, and authenticating using the credentials for access to the recovery virtual machine.

19. A method as recited in claim 17, wherein said initiating comprises communicating the request to a remote service, and wherein the address for the virtual machine comprises an Internet Protocol (IP) address for the virtual machine received from the remote service.

* * * * *